(12) United States Patent
Vaidyanathan et al.

(10) Patent No.: US 8,209,976 B2
(45) Date of Patent: Jul. 3, 2012

(54) SHAPE MEMORY-BASED ACTUATORS AND RELEASE MECHANISMS THEREFROM

(75) Inventors: Rajan Vaidyanathan, Oviedo, FL (US); Daniel W. Snyder, Melbourne, FL (US); David K. Schoenwald, Douglasville, GA (US); Nhin S. Lam, Orlando, FL (US); Daniel S. Watson, Orlando, FL (US); Vinu B. Krishnan, Hallandale, FL (US); Ronald D. Noebe, Cleveland, OH (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 848 days.

(21) Appl. No.: 12/323,091

(22) Filed: Nov. 25, 2008

(65) Prior Publication Data

US 2011/0173969 A1    Jul. 21, 2011

Related U.S. Application Data

(60) Provisional application No. 60/990,171, filed on Nov. 26, 2007.

(51) Int. Cl.
  *F01B 29/10*    (2006.01)
(52) U.S. Cl. .......................................... 60/528; 60/529
(58) Field of Classification Search ............. 60/527–529
  See application file for complete search history.

(56) References Cited

U.S. PATENT DOCUMENTS

| 4,325,217 | A | * | 4/1982 | Golestaneh | 60/527 |
| 4,441,318 | A | * | 4/1984 | Theckston | 60/527 |
| 4,472,113 | A | * | 9/1984 | Rogen | 417/321 |
| 4,476,067 | A | * | 10/1984 | Katou et al. | 261/39.2 |
| 4,583,365 | A | * | 4/1986 | John | 60/531 |
| 4,979,365 | A | * | 12/1990 | Baker | 60/528 |

OTHER PUBLICATIONS

J. Ma, et al., "High Temperature Shape Memory Alloys", International Materials Reviews. vol. 55, No. 5, pp. 257-315. 2010, Institute of Materials, Minerals and Mining and ASM International.

* cited by examiner

*Primary Examiner* — Hoang Nguyen
(74) *Attorney, Agent, or Firm* — Jetter & Associates, P.A.

(57) ABSTRACT

SM-based actuators (110) and release mechanisms (100) therefrom and systems (500) including one or more release mechanisms (100). The actuators (110) comprise a SM member (118) and a deformable member (140) mechanically coupled to the SM member (118) which deforms upon a shape change of the SM member triggered by a phase transition of the SM member. A retaining element (160) is mechanically coupled to the deformable member (140), wherein the retaining element (160) moves upon the shape change. Release mechanism (100) include an actuator, a rotatable mechanism (120) including at least one restraining feature (178) for restraining rotational movement of the retaining element (160) before the shape change, and at least one spring (315) that provides at least one locked spring-loaded position when the retaining element is in the restraining feature and at least one released position that is reached when the retaining element is in a position beyond the restraining feature (178). The rotatable mechanism (120) includes at least one load-bearing protrusion (310). A hitch (400) is for mechanically coupling to the load, wherein the hitch is supported on the load bearing protrusion (310) when the rotatable mechanism is in the locked spring-loaded position.

24 Claims, 9 Drawing Sheets

SHAPE MEMORY-BASED ACTUATORS AND RELEASE MECHANISMS THEREFROM

CROSS REFERENCE TO RELATED APPLICATIONS

This application claims the benefit of Provisional Application Ser. No. 60/990,171 entitled "HITCH RELEASE MECHANISM", filed Nov. 26, 2007, which is herein incorporated by reference in its entirety.

RIGHTS UNDER FEDERALLY SPONSORED RESEARCH

The invention was sponsored in part by the U.S. National Aeronautical and Space Administration (NASA) under contract. The U.S. Government may have certain rights to the invention.

FIELD OF THE INVENTION

Embodiments of the invention are related to shape memory-based actuators and release mechanisms therefrom.

BACKGROUND OF THE INVENTION

Some industries, such as the space, defense, nautical, and aeronautical industries rely on release mechanisms for numerous applications in which heavy loads must be secured to a vehicle or structure for a period of time, and then be released. In the space industry it is common to launch a spacecraft with some of its parts folded down against the exterior of the spacecraft. For example, when the spacecraft is a solar powered earth satellite, large solar panels must be folded down so that the spacecraft can fit inside the payload space of a launch vehicle. Antennae, sensors, and nuclear power plants (mounted on extensible members) are examples of other bulky and heavy appendages that may need to be folded down to the side of a spacecraft during launch.

After the spacecraft has been placed in space, the folded parts must then be reliably deployed. Typically, this is done via a bias element that tends to urge the folded part into an extended position. During launch, a retention member, which will later be released upon a remote command, counters the bias element. The retention member is commonly referred to in the art as the "pin," although it sometimes is not literally in the form of a pin. The actuation mechanism that releases the retention member (e.g., pin) is commonly known in the art as a "pin puller".

Other structures, such as single-use rocket boosters and external fuel tanks, must be released quickly and reliably for proper functioning of the vehicle. Because such heavy loads must be released very rapidly and with high reliability, pyrotechnic release mechanisms are conventionally employed. Such mechanisms have the disadvantage of producing sparks and debris, with the potential to damage the vehicle. Furthermore, pyrotechnic release mechanisms cannot be easily reset after the pyrotechnic charge has been detonated, making repeated use both problematic and expensive.

Actuators based on shape memory (SM)-based release mechanisms are generally known. SM actuators have certain distinct advantages over other forms of actuators. They integrate sensory and actuation functions. The SM material element inherently senses a change in temperature and actuates by undergoing a shape change as a result of a phase transformation. Consequently, the need for external electronic sensors and control can be eliminated. SM release mechanisms function in a clean, debris-less, spark-free manner. The shape change that is responsible for the actuator displacement is an inherent material property. It is not associated with moving parts that require lubrication or electrical signals with a potential to spark. SM release mechanisms have high power to weight and stroke length to weight ratios and posses the ability to function in zero-gravity environments with small, controlled accelerations. The displacement strains are a result of a thermally-induced phase transformation which can be controlled by the heat transfer rate (e.g., with appropriate insulation).

However, there are several significant problems with known SM-based actuators. One problem relates to environmental stimulus such as vibration or changes in temperature resulting in the inadvertent triggering of the release mechanism. Inadvertent release can pose a major safety concern. Another limitation of known shape memory-based actuators relates to an inability to secure heavy loads, such loads weighing more than about 25 to 50 pounds. Another problem is an in service reliability failure of the release mechanism due to crimping and mechanical fastening of the SM element required in conventional release mechanisms. There is thus a need for new shape memory-based actuators that provide higher reliability, more resistance to inadvertent release, and are capable of securing and releasing significantly heavy loads.

SUMMARY

Embodiments of the present invention to provide shape memory (SM)-based actuators and release mechanisms therefrom and systems including one or more such release mechanisms. An actuator comprises a shape memory (SM) comprising member, and a deformable member mechanically coupled to the SM member which deforms upon a shape change of the SM member that is triggered by a phase transition of the SM member. A retaining element is mechanically coupled to the deformable member, wherein the retaining element moves upon the shape change. The actuator generally includes an outer housing.

A release element according to an embodiment of the invention comprises at least one actuator and a rotatable mechanism. The rotatable mechanism comprises at least one restraining feature for restraining rotational movement of the retaining element before the shape change, and at least one spring that provides at least one locked spring-loaded position when the retaining element is in the restraining feature and at least one released position that is reached when the retaining element is in a position beyond the restraining feature. The rotatable mechanism comprises an open portion having at least one load-bearing protrusion extending into the open portion. A hitch mechanically couples to a load, wherein a first portion of the hitch is inserted in the open portion of the rotatable mechanism and a second portion of the hitch is supported on the load bearing protrusions when the rotatable mechanism is in the locked spring-loaded position. Upon the shape change of the SM member the retaining element moves to a position beyond the restraining feature so that the rotatable mechanism rotates toward the released position to move the load bearing protrusion(s) sufficiently to release the hitch and its associated load.

The SM member and the deformable member can comprise springs. The springs can both comprise compression springs. Compression springs have the advantage of not requiring mechanical fastening.

In typical operation, the retaining element acts to maintain the rotatable mechanism in its spring-loaded position. When the actuator is triggered and phase change of the SM element occurs, the retaining element is retracted such that the spring-loading in the rotatable mechanism is released, causing the rotatable mechanism to rotate. The rotation causes the load-bearing protrusions to assume a position in which the hitch is no longer supported, releasing the hitch from the rotatable mechanism.

DETAILED DESCRIPTION

Embodiments of the present invention comprise SM-based actuators and release mechanisms therefrom and systems including one or more such release mechanisms. The actuators comprise a SM member and a deformable member mechanically coupled to the SM member which deforms upon a shape change of the SM member triggered by a phase transition of the SM member. A retaining element is mechanically coupled to the deformable member, wherein the retaining element moves upon the shape change. Although the shape change of the SM member is generally described herein as being a length adjustment and thus the movement of the retaining element is generally described herein as being a pin that provides an adjustable length, the SM member can provide other shape changes to provide other movements of the retaining element, such as bending of a plain or hook formed member.

Figure 1:
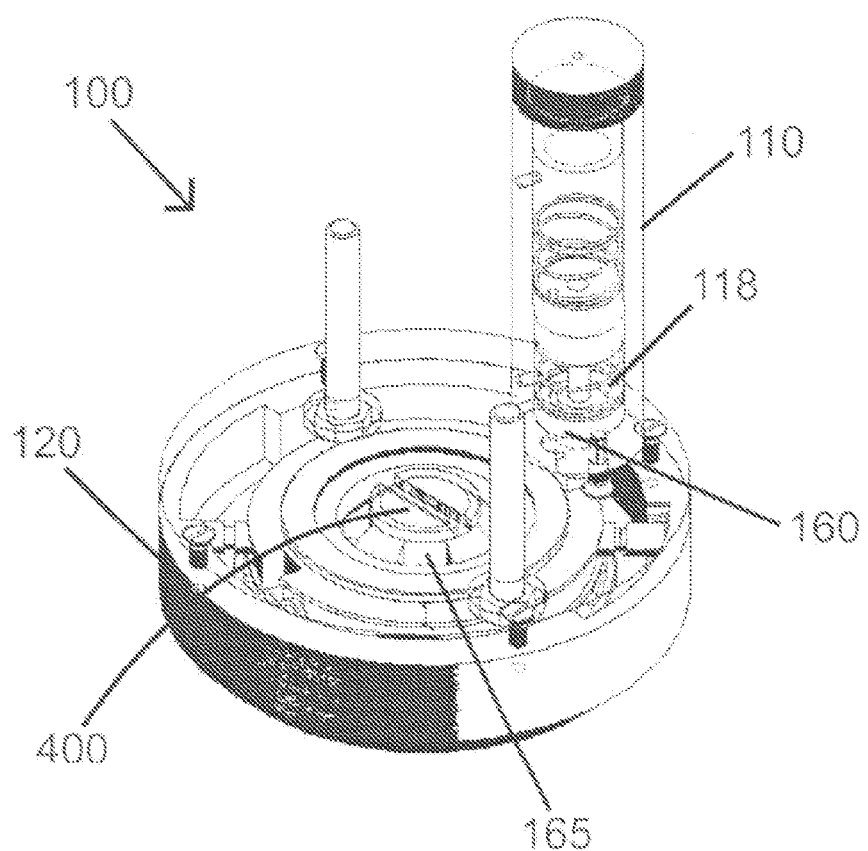
FIG. 1 depicts a release mechanism including an actuator comprising a SM comprising member coupled to a retaining element operable to move the retaining element upon shape change and a rotatable mechanism having a restraining feature for securing the retaining element prior to shape change of the SM member, according to an embodiment of the present invention.

An exemplary release mechanism 100 according to an embodiment of the present invention is shown in FIG. 1. The release mechanism 100 comprises at least one actuator 110 comprising a SM comprising member 118 coupled to a retaining element 160. Although only one actuator 110 is shown in FIG. 1, additional actuators can be provided to provide redundancy and further decrease the chance of accidental release.

The SM material of SM comprising member 118 "remembers" its geometry. As known in the art, after a sample of the SM material has been deformed from its original configuration, it regains its original geometry by a shape change in response to some trigger. The trigger can be from a variety of stimulus, such as temperature, an electric current, or a magnetic field. If a magnetic field is the trigger, then the release mechanism can be shielded (e.g., by an electrical conductor) from extraneous magnetic fields to prevent accidental release. A suitable SM material can be an SM alloy, SM polymer, or other SM material. For example, the SM may generally be any of the three main types of SM alloys being copper-zinc-aluminum-nickel, copper-aluminum-nickel, and nickel-titanium (NiTi) alloys. NiTi alloys generally have the advantage of superior mechanical properties when compared to copper-based SM alloys. Copper SM alloys generally have the advantage of lower cost. In one particular embodiment of the present invention, the SM material for SM member 118 comprises primarily (by weight) an SM alloy of the NiTi type. The alloy can also comprise Fe. For high temperature applications elemental additions can include Pd or Pt, or Pd and Pt, such as NiTiPd, NiTiPt or NiPdPt.

Figure 3A:
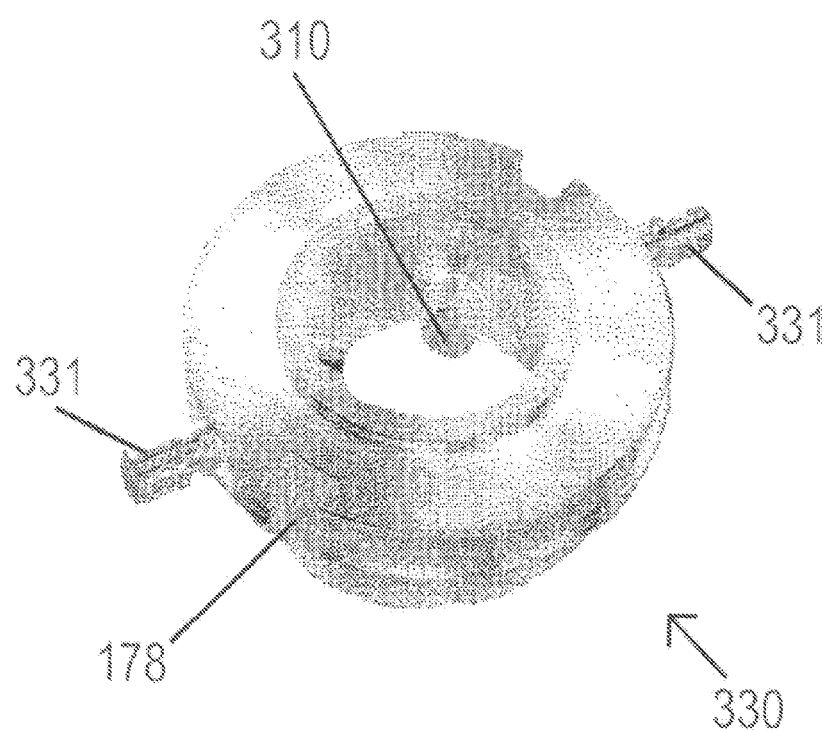
FIGS. 3A-D show an exemplary rotating portion for a rotatable mechanism, an exemplary fixed portion of an exemplary rotatable mechanism, and an open view (having its lid separated) of an assembled rotatable mechanism, and the underside of the lid, respectively, according to an embodiment of the invention.

The retaining element 160 moves upon shape change of the SM member 118. Release mechanism 100 includes a rotatable mechanism 120 that has its cover that is generally provided removed to show additional details. Rotatable mechanism 120 comprises at least one restraining feature (see restraining feature 178 shown in FIGS. 3A and 3C) for restraining rotational movement of the retaining element 160 before the shape change, and at least one loading spring (see loading spring 315 shown in FIG. 3C) that provides at least one locked spring-loaded position when the retaining element 160 is in the restraining feature 178 and at least one released position that is reached when the retaining element 160 is in a position beyond the restraining feature 178. The rotatable mechanism 120 comprises an open portion 165 having one or more load-bearing protrusions (see load-bearing protrusions 310 shown in FIGS. 3A and 3C) extending into the open portion 165.

A hitch 400 is for mechanically coupling to a load (not shown), wherein a first portion of the hitch 400 is inserted in the open portion 165 of the rotatable mechanism 120 and a second portion of the hitch is supported on the load bearing protrusions (see load-bearing protrusions 310 shown in FIGS. 3A and 3C) when the rotatable mechanism 120 is in the locked spring-loaded position. In operation of release mechanism 100, upon the shape change of the SM element 118 the retaining element 160 moves to a position beyond the restraining feature so that the rotatable mechanism rotates toward the released position to move the load bearing protrusions sufficiently to release the hitch 400 and its associated load.

Figure 2:
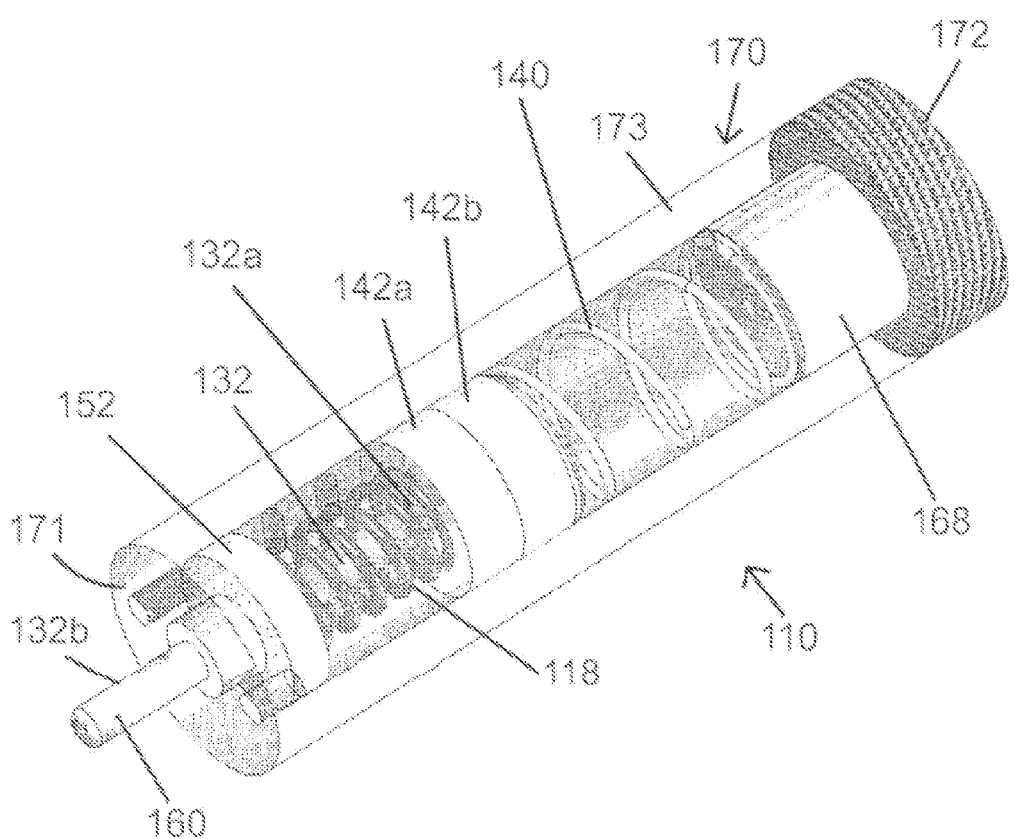
FIG. 2 depicts an actuator module including housing and a SM comprising member according to an embodiment of the present invention.

FIG. 2 depicts a SM-based actuator 110 that includes a retaining element 160 shown as a "pin" that is operable using a SM-based "pin puller" mechanism according to an embodiment of the present invention. Retaining element 160 is coupled to SM member 118, which is shown as a spring and provides an adjustable length. The retaining element 160 together with one or more features provided by the release mechanism 120 (e.g. restraining feature 178 described below) which may generally be a variety of structural combinations are operable to prevent the rotatable mechanism 120 while being in a torqued (non-equilibrium) position from releasing and thus rotating. Examples for retaining element 160 can include a pin, a dowel, a hook, and a latch. In the embodiment shown, retaining element 160 is not the primary load bearing member which enables supporting significantly heavier loads.

The spring shape of SM comprising member 118 provides relatively high stroke upon phase change. However, other shapes of the SM material for SM comprising member 118 can generally be used. The SM comprising spring 118 can be any type of spring, including but not limited to helical springs, leaf springs, wave springs, cantilevered springs, or torsion springs. The SM member can also take other forms, such as a plurality of spring washers or one or more wires. In some embodiments of the present invention, the adjustable length member 118 is a helical spring, and may be either compression or tension spring. Compression springs make actuator 110 and thus release mechanism 100 more shock resistant. As used herein, compression springs are springs which expand upon heating as opposed to tension springs which compress upon heating.

In some embodiments of the present invention, such as shown in FIG. 2, the SM comprising member 118 is used in conjunction with a deformable member 140 that comprises a bias spring 140. The bias spring 140 may generally be any type of spring. In certain embodiments of the present invention, the bias spring 140 is a helical spring, and may be either a compression or tension spring. In one embodiment of the invention the SM member 118 and bias spring 140 both comprise compression springs. The bias spring 140 keeps the retaining element 160 in position until the SM member 118 is triggered to change shape and overcome the force exerted by bias spring 140.

As shown in FIG. 2, the actuator 110 comprises a fixed spacer 152 having an inner aperture therethrough, at least one movable spacer 142 (spacers 142a and 142b are shown), and a shaft 132 having its first end 132a secured to movable spacer 142a having an attached retaining element 160 portion on its second end 132b that extends through the inner aperture of fixed spacer 152. SM member 118 embodied as a spring is shown radially outside shaft 132 and interposed between the movable spacer 142a and fixed spacer 152. SM member 118 is generally unbound to both fixed spacer and movable spacer 142. This arrangement eliminates the need for crimping and mechanical fastening that are known sources of failures for SM alloys. Spacer 142a is generally mechanically coupled to the shaft 132, such as using an adhesive or by a weld or set screw. Bias spring 140 is coupled between movable spacer 142b and a fixed end spacer 168. The distal end of shaft 132 is identified in FIG. 2 as retaining element 160.

In one embodiment of the invention spacers 152 and 142a comprise electrically conductive materials, such as metals. The housing 170 can also include respective apertures (not shown) to allow electrical connections to reach spacers 152 and 142a to allow applying an electrical bias (e.g. from a power source, such as a battery, not shown) between spacers 152 and 142a so that SM member 118 is heated via resistive heating to effectuate triggering and thus shape change.

Actuator 110 is shown including a housing 170, such as a cylindrical housing. The housing 170 can have a first circular surface 171, a second circular surface 172, and a tubular surface 173. The materials from which the housing is made can include a variety of materials that can be selected for one or more properties selected from thermal, structural, mechanical, electrical and magnetic protection properties. On the side opposite retaining element 160, an actuator cap 172 is provided.

The actuator 110 shown in FIG. 2 has an extended state and a recessed state. The retaining element 160 extends outside of the housing 170 through an opening in the first circular surface 171 in the extended state, and either extends to a lesser degree or does not extend outside of the housing 170 in the recessed state. As described above, the SM member 118 and the bias spring 140 can both be helical springs. In the embodiment shown, when the SM member 118 undergoes a phase change, the length of SM member 118 is significantly altered.

The alteration in the length of the SM member 118 results in the shaft 132 switching from the extended state to the recessed state, or vice versa. In another embodiment (not shown), the shaft 132 and the retaining element 160 are separate components with the shaft 132 being operably coupled to the retaining element 160.

FIGS. 3A-D show an exemplary rotating portion for a rotatable mechanism, an exemplary fixed portion of an exemplary rotatable mechanism, and an open view (having its lid separated) of an assembled rotatable mechanism, and the underside of the lid, respectively, according to an embodiment of the invention. Rotating portion 330 includes first and second outer protrusions 331 and one or more inner loadbearing protrusions 310 for supporting a load supporting structure, such as hitch 400. For maximum strength, rotating portion 330 can be a monolithic metal comprising (e.g. steel) structure so that load-bearing protrusions 310 are integrally formed, such as by machining or molding. Once actuated, the entire rotating portion 330 rotates. The exemplary hitch 400 shown in FIG. 4 is a load supporting structure that is supported by the load-bearing protrusions 310.

Figure 3B:
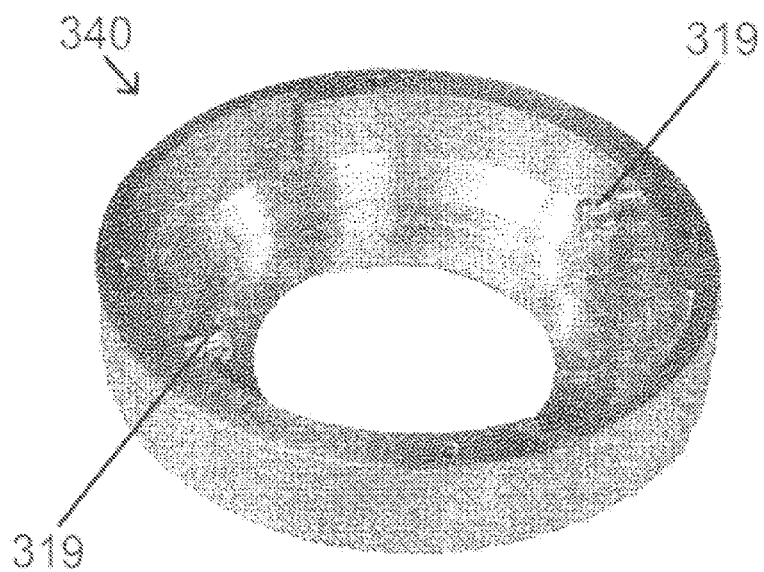

Exemplary fixed portion 340 of the exemplary rotatable mechanism 120 shown in FIG. 3B includes inner protrusions 319. Fixed portion 340 remains fixed even after actuation. Rotating portion 330 is configured to fit within fixed portion 340 on a bearing. Each loading spring 315 described below and shown in FIG. 3C is held between protrusions 319 and 331.

Figure 3C:
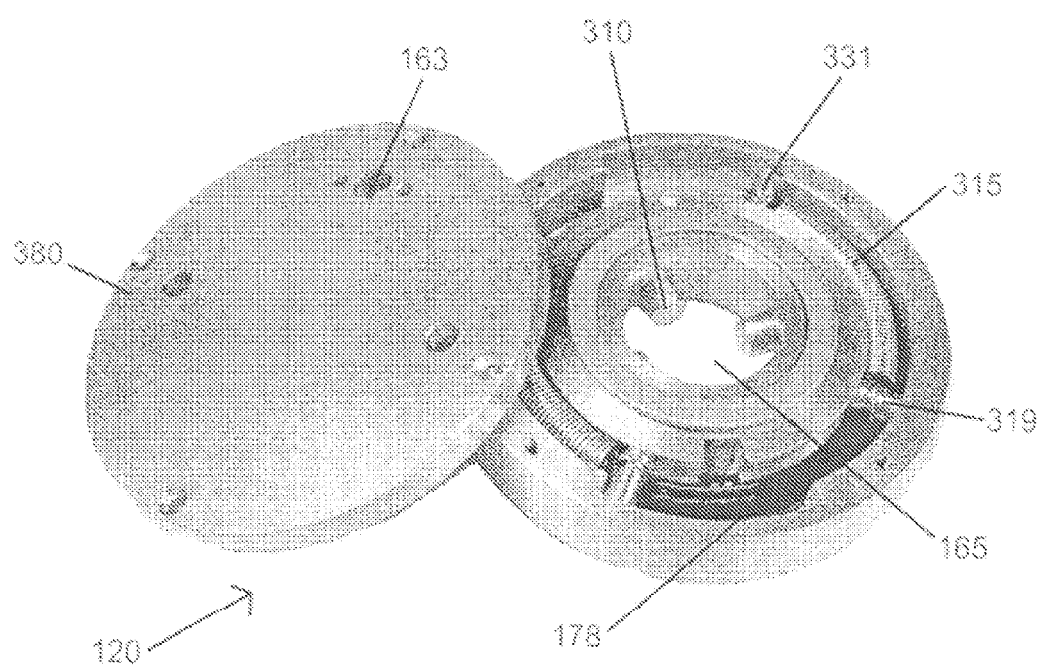
Figure 4:
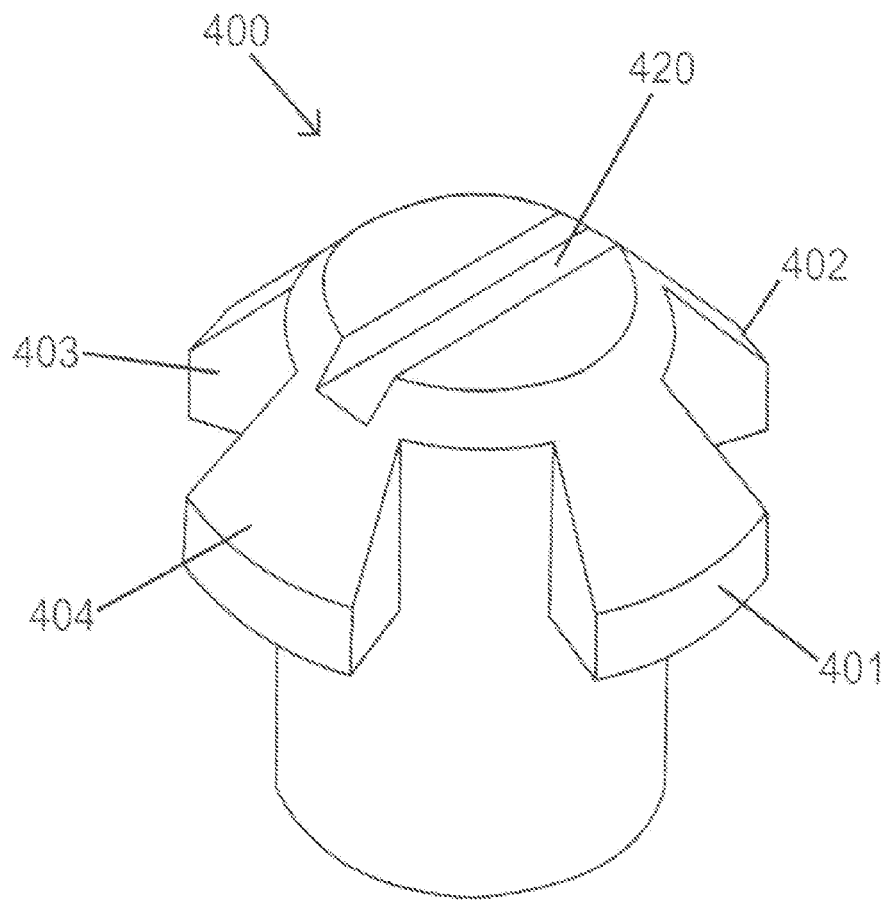
FIG. 4 depicts a hitch according to an embodiment of the present invention.

Assembled rotatable mechanism 120 shown in FIG. 3C is shown having its lid 380 open to reveal its features. Rotatable mechanism 120 includes loading springs 315 for providing a locked spring-loaded position and a released position. Although two loading springs 315 are shown, embodiments of the invention can include a single loading spring. The loading springs 315 are generally helical springs of either the compression or tension type. The loading springs 315 can be made from any suitable material known to those skilled in the art. As described above, loading spring 315 are held between protrusions 319 and 331.

Rotatable mechanism 120 includes a plurality of receiving features 163 which allows the retaining element 160 to be inserted therein to be secured by securing feature 178. A portion of the hitch 400 is shown inside the rotatable mechanism 120 being supported on the load bearing protrusions 310 when the rotatable mechanism is in the locked spring-loaded position. As described above, the release mechanism 100 is operable such that when the retaining element 160 shown in FIGS. 1 and 2 is recessed from the securing feature 178, the rotatable mechanism 120 rotates, a rotation of the rotatable mechanism rotating the rotating portion 330 and its load bearing protrusions 310 sufficient to release the hitch 400. Although not shown, commercially available bearings can be used in the rotatable mechanism 120 to ease rotation.

The securing feature 178 may take on other various forms other than cut out (aperture) forms, such as holes for additional stability. There are generally no fewer such securing features 178 than there are retaining elements 160. There may be more securing features 178 for accepting the retaining element 160 than there are retaining elements 160, to allow changes in the configuration of the release mechanism 100.

The rotatable mechanism 120 allows the release mechanism 100 to support a load far in excess of what the actuator 110 itself could support if the retaining element was load bearing as is the case in conventional release mechanisms. In embodiments of the present invention, the load bearing protrusions 310 are capable of supporting the entire weight of the hitch 400 and its associated load. The load bearing protrusions 310 can generally be of any shape geometrically adequate to support the hitch 400. The load bearing protrusions 310 are configured so as to prevent motion of the hitch 400 in the locked spring-loaded position, but to allow the hitch to freely fall away from the release mechanism 120 in the released position. There is at least one load bearing protrusion 310, although stability will generally be increased if there are a plurality of load bearing protrusions 310, such as at least three protrusions.

In the particular embodiment of the present invention shown in FIG. 4, the hitch 400 is substantially cylindrical, the portion of the hitch that is inserted into the rotatable mechanism 120 comprises four support ridges 401-404, each support ridge having an upper sloped surface, a lower flat surface, two radially oriented surfaces, and an arced surface. The lower flat surface of the ridges 401-404 lies within a plane that is roughly perpendicular to the altitude of the cylindrical hitch. The arced surface forms an arc that is concentric with but wider than the cylindrical hitch. The radially-oriented surfaces are roughly vertical, and extend from the arced surface and the upper sloped surface to the side of the hitch. The upper sloped surface extends from the arced surface to the top of the hitch. Hitch 400 also includes a first raised (protruding) or indented feature shown in FIG. 4 as a groove 420.

Figure 3D:
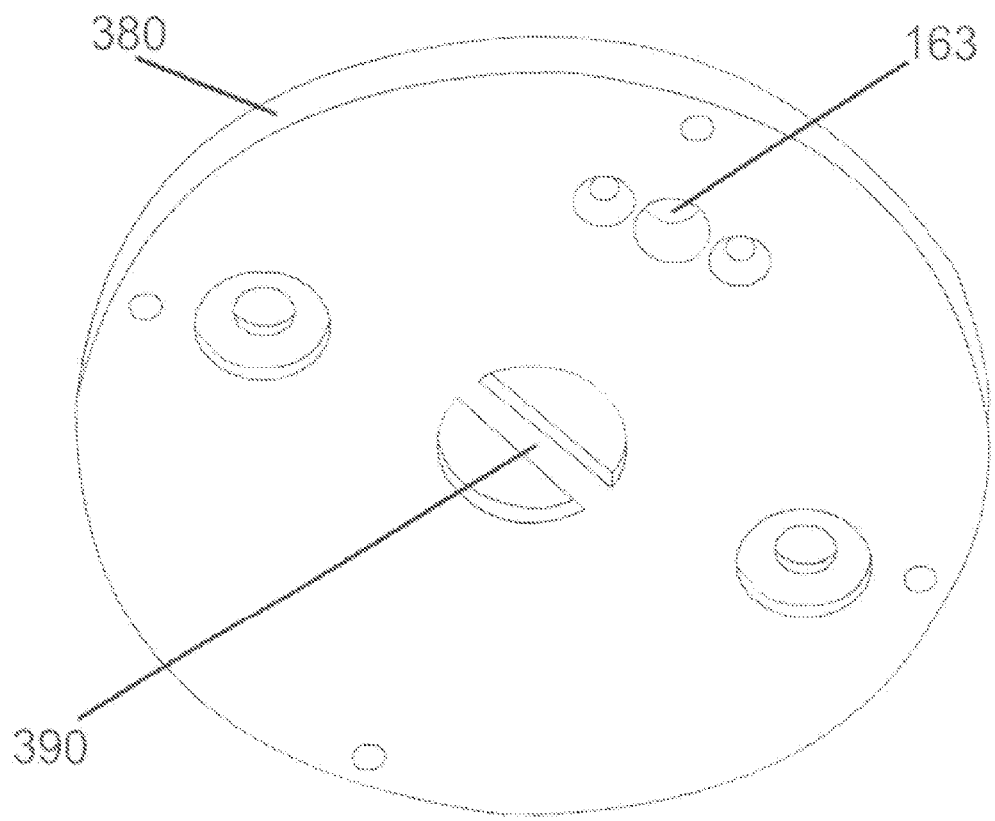

FIG. 3D shows the underside of an exemplary lid 380 for a rotatable mechanism according to an embodiment of the invention. The underside of lid 380 comprises at least one raised or indented second feature 390 shown in FIG. 3D as a protruding linear feature. The protruding feature 390 is configured (e.g. shaped and sized) to lock into the groove 420 of hitch 400 to enable the protrusions 310 upon actuation to slide under the lower flat surface of the ridges 401-404, enabling the hitch 400 to freely fall without rotating that would otherwise result from rotation of protrusions 310. In another arrangement (not shown), the hitch includes a raised feature instead of a groove such as groove 420 and lid 380 includes an indented feature (e.g. groove) configured to lock with the raised feature of the hitch. Loads are generally secured (e.g. welded or mechanical fastened) to the side of hitch 400 opposite to groove 420.

The hitch 400 can be constructed of any material capable of bearing heavy loads known to those skilled in the art, such as steel. The support ridges 401-404 are positioned such that each is supported by one of the four load-bearing protrusions 310 of rotatable mechanism 120 when the rotatable mechanism 120 is in the locked spring-loaded position. As described above, the protrusions 310 rotate with rotatable mechanism 120 and slide under the flat surface 401-404 of hitch 400 which is locked in position by the protrusion 390 of lid 380 mating with the groove 420.

In embodiments of the present invention, the actuator 110 is housed within an actuator module such as shown in FIG. 2, and the rotatable mechanism 120 is housed within a separate module as shown in FIG. 3C. This modular embodiment has the advantage of separating the actuator from the rotatable mechanism 120, thus protecting the actuator 110 from potentially extreme conditions that may be present in certain applications, such as that may be present near a rotatable mechanism 120 module.

If the trigger for retaining element 160 of the actuator module 110 is temperature, it will contribute to a reduction in accidental releases if the temperature of phase-change of the SM material is well above the normal ambient temperature of the release mechanism. The phase change temperature of the SM material will generally be above room temperature. For applications such a missile release during flight or fin deployment during flight, accidental releases can be reduced if the temperature of phase-change temperature is generally much higher than room temperature, such as over about 95° C.

In one embodiment of the invention temperature the SM alloy is a high temperature alloy. As use herein, "a high temperature alloy" refers to an alloy that has a phase change at ≧95° C. For spaceflight applications, accidental releases can be prevented if the temperature of phase-change is generally 95° C. or higher. An added measure of safety is secured if the temperature of phase-change is generally 95° C. or higher.

One advantage of embodiments of the invention is that the pin puller and rotatable mechanism 120 generally employed actuate under sliding and/or rolling friction. A higher amount of friction will generally result in a higher degree of control. Accidental releases resulting from vibration or mechanical shock are less likely if increased friction is used, such as friction between the retaining element 160 and the securing feature 178. This can be a significant advantage for applications in which controlled release or prevention of accidental release is desired and excessive vibration or mechanical shock is likely.

In typical operation, the rotatable mechanism 120 is locked in a spring-loaded position by first rotating the rotatable mechanism 120 and holding the rotating mechanism in the spring loaded position. Next, the retaining element 160 of the actuator 110 is automatically engaged by bias element 140 into the securing feature 178 which prevents the rotatable mechanism 120 from rotating and thus shifting from the locked spring-loaded position to the released position. The hitch 400 is inserted into the rotatable mechanism so that it is supported by load-bearing protrusions 310 and the groove 420 locked into the protrusion 390 on the underside of the lid 380. The load can be secured to the hitch 400 before or after insertion. To effectuate release, the retaining element 160 is disengaged by a suitable stimulus applied to SM member 118 of actuator 110 which results in rotatable portion 330 of rotatable mechanism 120 rotating and thus shifting from the locked spring-loaded position to the released position. In the released position, the load-bearing protrusions 310 are positioned such that the hitch 400 and its load are able to fall away from the release mechanism 120, such as under the influence of gravity. Another embodiment (not shown) can include a spring loaded hitch (e.g. compression springs in the top of hitch 400) that pushes out the hitch instead of relying on gravity. This embodiment is particularly useful in near zero gravity environments (e.g. in space).

Release mechanisms according to the invention have numerous applications or potential applications, including but not limited to, solid-rocket booster separation, umbilical release, hold-down bolts in a launch pad, fastening cargo on aircrafts, expendable fuel tank release, missile release during flight, bomb release mechanisms, missile defense applications, and missile fins deployment during flight.

Figure 5A:
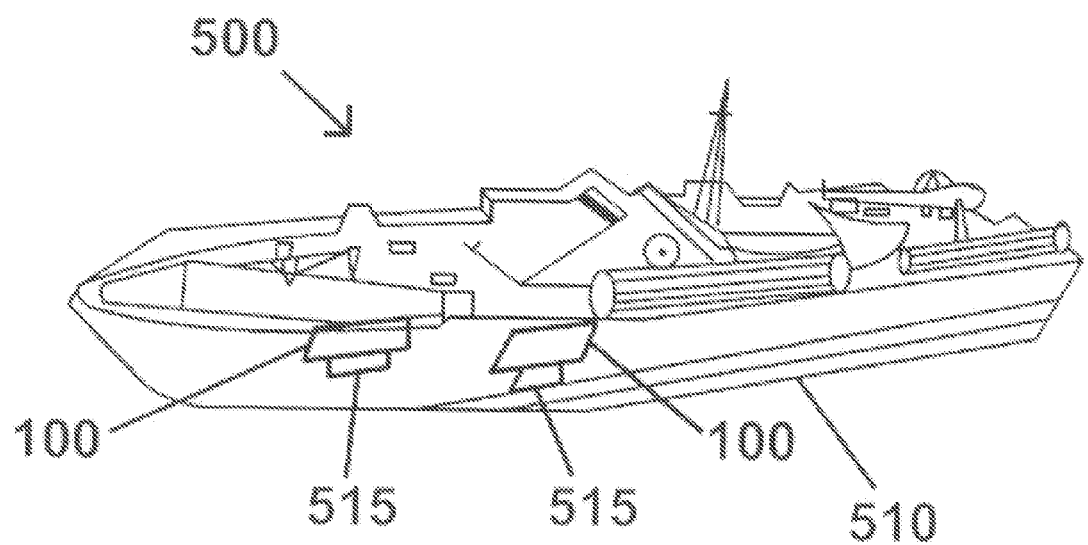
FIG. 5A shows a depiction of a system comprising a ship having a quick release tie-down mechanism according to an embodiment of the invention.

On particular application is for quick release tie-downs for a transport vehicles such as for ships and aircraft for transporting supplies or cargo. In some of these embodiments, the release mechanisms according to embodiments of the invention can provide quick release of military equipment. FIG. 5A shows a depiction of a system 500 comprising a ship 510 having a quick release tie-down mechanism according to an embodiment of the invention. Ship 510 includes a plurality of release mechanisms 100 according to an embodiment of the invention. Each release mechanism secures a load 515 during transport. The hitch 400 would be coupled to the load while the release mechanism 100 would be fixed on the transport vehicle. This embodiment can include a spring loaded hitch (e.g. compression springs in the top of hitch 400) that pushes out the hitch. Quick release can be accomplished in a number of ways. One method involves including a receiver, a signal processing comprising controller (not shown) and a triggering mechanism operably coupled to the release mechanism, and transmitting (e.g. over the air) a release signal that is received by the receiver, which results in generation of a control signal from the controller triggering the triggering mechanism. For example, an electronic switch can be closed, wherein the triggering mechanism applies a stimulus (e.g. current or heating) sufficient to result in a shape change of the SM member that results in release of the loads 515.

Figure 5B:
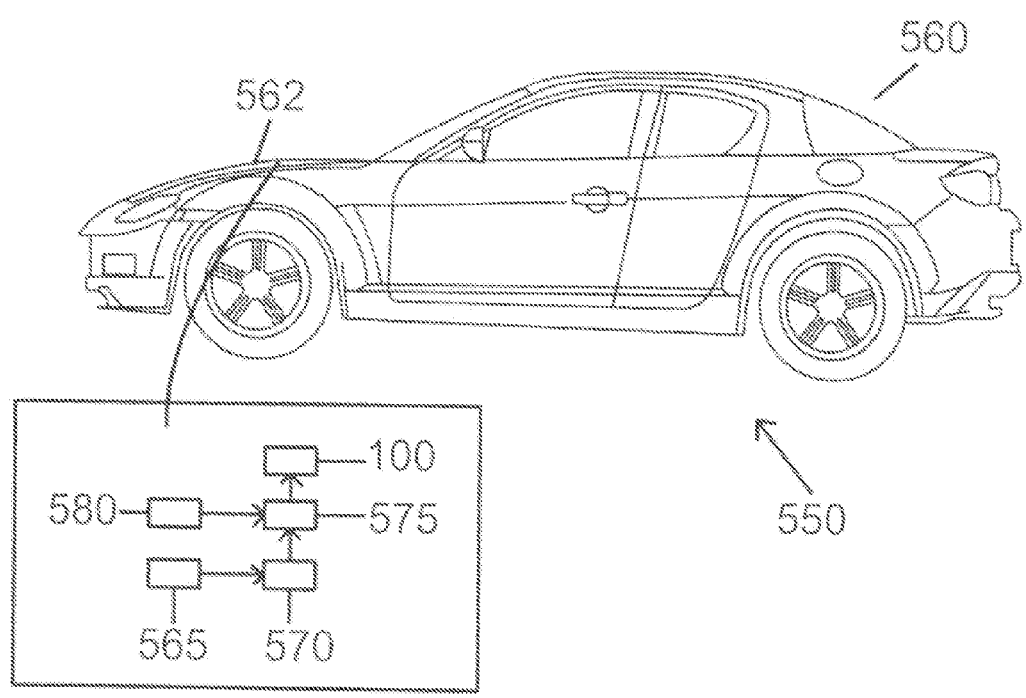
FIG. 5B shows a depiction of a system comprising a motor vehicle having a quick release mechanism for releasing the hood of the motor vehicle upon sensing a significant impact, such as an accident, according to an embodiment of the invention.

Embodiments of the invention also include transport vehicles comprising motor vehicles that carry cargo and/or individuals. One motor vehicle application is for hood release mechanisms. For example, upon sensing an accident (e.g. using a momentum sensor to sense impact) the hood of an automobile can be opened by the release mechanism to avoid or at least limit accident debris from entering the automobile through a broken windshield that can result from an accident that is known to have the potential to add injury to passengers. The mechanism can also be applied to limit injury to pedestrians involved in collisions by preventing impact between pedestrians and windshields. Another example is a power train drop mechanisms that activates following impact so that the power train components are prevented from entering the cab portion of the vehicle. FIG. 5B shows a depiction of a system 550 comprising a motor vehicle 560 having a quick release mechanism for releasing the hood of the motor vehicle upon sensing a significant impact, such as an accident, according to an embodiment of the invention. Motor vehicle 560 includes at least one release mechanisms 100 according to an embodiment of the invention. The release mechanism 100 is coupled to the hood 562 of the automobile. Motor vehicle 560 includes an impact sensor 565, such as a momentum sensor. Momentum sensors are generally already provided for automobiles as part of the airbag system. The output of momentum sensor 565 is coupled to a signal processing comprising controller 570 which controls an electronic switch 575. When switch 575 is closed, power supply 580 applies power to heat the SM member of release mechanism 100 sufficiently to result in a shape change of the SM member that results in release of the hood 562.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an", and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A release mechanism for releasing a load, comprising:
at least one actuator comprising a shape memory (SM) comprising member,
a deformable member mechanically coupled to said SM member which deforms upon a shape change of said SM member triggered by a phase transition of said SM member,
and a retaining element mechanically coupled to said deformable member, wherein said retaining element moves upon said shape change;
a rotatable mechanism comprising at least one restraining feature for restraining rotational movement of said retaining element before said shape change, and
at least one spring that provides at least one locked spring-loaded position when said retaining element is in said restraining feature and at least one released position that is reached when said retaining element is in a position beyond said restraining feature,
said rotatable mechanism having an open portion including at least one load-bearing protrusion extending into open portion, and
a hitch for mechanically coupling to said load,
wherein said hitch is inserted in said open portion, said hitch being supported on said load bearing protrusion when said rotatable mechanism is in said locked spring-loaded position;
wherein upon said shape change said retaining element moves to said position beyond said restraining feature so that said rotatable mechanism rotates toward said released position to move said load bearing protrusion sufficiently to release said hitch and said load.

2. The release mechanism of claim 1, wherein said SM member comprises a SM spring that provides an adjustable length.

3. The release mechanism of claim 2, wherein said deformable member comprises a compression spring and said SM spring comprises a compression spring.

4. The release mechanism of claim 1, wherein said SM member provides said phase change at a temperature of 95° C.

5. The release mechanism of claim 1, wherein said actuator further comprises: a shaft having a first end and a second end, wherein said retaining element is secured or part of said second end; a fixed spacer having an aperture therethrough, wherein said second end of said shaft extends through said aperture; at least one movable spacer, wherein said first end is secured to said movable spacer; at least one fixed end spacer, wherein said deformable member is interposed between said movable spacer, and said fixed end spacer.

6. The release mechanism of claim 5, wherein said SM member is positioned radially outside shaft and interposed between said movable spacer and said fixed spacer.

7. The release mechanism of claim 6, wherein said SM member is exclusive of mechanical fastening or crimping to both said fixed spacer and said movable spacer.

8. The release mechanism of claim 7, wherein said fixed spacer and said movable spacer comprise electrically conductive materials, further wherein said SM member electrically couples said fixed spacer to said movable spacer.

9. The release mechanism of claim 8, wherein said electrically conductive materials for said fixed spacer and said movable spacer comprise at least one metal.

10. The release mechanism of claim 1, wherein said retaining element is non-load bearing and said load-bearing protrusions primarily support a weight of said load.

11. The release mechanism of claim 1, wherein said rotatable mechanism comprises a fixed portion having at least one inner protrusion, and a rotating portion including at least one outer protrusion and said load-bearing protrusion on its inner surface, wherein said spring is coupled between said inner protrusion and said outer protrusion.

12. The release mechanism of claim 1, wherein rotatable mechanism includes a lid, and said hitch includes at least one raised or indented first feature, wherein said lid comprises at least one raised or indented second feature configured for locking said first feature to restrict rotation of said hitch when said load-bearing protrusion moves to enable release of said hitch.

13. An actuator, comprising:
a shaft having a first end and a second end,
a pin-shaped retaining element secured or part of said second end;
a fixed spacer having an aperture therethrough, wherein said second end of said shaft extends through said aperture;
at least one movable spacer, wherein said first end is secured to said movable spacer;
at least one fixed end spacer;
a shape memory (SM) comprising member between said fixed spacer having an aperture therethrough and said movable spacer;
a deformable member mechanically coupled to said retaining element and said SM member which deforms upon a shape change of said SM member triggered by a phase transition of said SM member; and
an outer housing having an opening in a first end surface, wherein said pin-shaped retaining element extends outside of said housing through said opening in its extended state, and either extends to a lesser degree or does not extend outside said housing in its recessed state.

14. The actuator of claim 13, wherein said SM member comprises a SM spring that provides an adjustable length.

15. The actuator of claim 13, wherein said deformable member comprises a compression spring and said SM spring comprises a compression spring.

16. The actuator of claim 13, wherein said SM member comprises an alloy including at least three elements with at least one of Pd and Pt that provides said phase change at a temperature of $\geqq 95°$ C.

17. The actuator of claim 16, wherein said SM member is positioned radially outside shaft and interposed between said movable spacer and said fixed spacer.

18. The actuator of claim 17, wherein said SM member is exclusive of mechanical fastening or crimping to both said fixed spacer and said movable spacer.

19. The actuator of claim 18, wherein said fixed spacer and said movable spacer both comprise electrically conductive materials, further wherein said SM member electrically couples said fixed spacer to said movable spacer.

20. The actuator of claim 19, wherein said electrically conductive materials for said fixed spacer and said movable spacer comprise at least one metal.

21. A system including at least one release mechanism for releasing a load, comprising: a transport vehicle; a least one release mechanism positioned in or on the transport vehicle, said release mechanism comprising: at least one actuator comprising a shape memory (SM) comprising member, a deformable member mechanically coupled to said SM member which deforms upon a shape change of said SM member triggered by a phase transition of said SM member, and a retaining element mechanically coupled to said deformable member, wherein said retaining element moves upon said shape change; a rotatable mechanism comprising at least one restraining feature for restraining rotational movement of said retaining element before said shape change, and at least one spring that provides at least one locked spring-loaded position when said retaining element is in said restraining feature and at least one released position that is reached when said retaining element is in a position beyond said restraining feature, said rotatable mechanism comprising an open portion having at least one load-bearing protrusion extending into said open portion, and a hitch for mechanically coupling to said load, wherein a first portion of said hitch is inserted in said open portion of said rotatable mechanism and a second portion of said hitch is supported on said load bearing protrusion when said rotatable mechanism is in said locked spring-loaded position; wherein upon said shape change said retaining element moves to said position beyond said restraining feature so that said rotatable mechanism rotates toward said released position to move said load bearing protrusion sufficiently to release said hitch and said load.

22. The system of claim 21, wherein said transport vehicle comprises an automobile comprising a hood and a power train and said load comprises at least one of said hood and said power train.

23. The system of claim 21, wherein said transport vehicle comprises a ship or an aircraft, and said load comprises cargo.

24. The system of claim 23, wherein cargo comprises military equipment.

* * * * *